United States Patent [19]

Niemann

[11] 4,139,435

[45] Feb. 13, 1979

[54] METHOD OF SEPARATING ISOTOPES

[75] Inventor: Hans-Joachim Niemann, Erlangen, Fed. Rep. of Germany

[73] Assignee: Kraftwerk Union Aktiengesellschaft, Mülheim an der Ruhr, Fed. Rep. of Germany

[21] Appl. No.: 676,461

[22] Filed: Apr. 13, 1976

[30] Foreign Application Priority Data

Apr. 18, 1975 [DE] Fed. Rep. of Germany ....... 2517173

[51] Int. Cl.$^2$ .............................................. B01J 1/10
[52] U.S. Cl. .................... 204/157.1 R; 204/DIG. 11; 55/2
[58] Field of Search ...................... 204/DIG. 11; 55/2

[56] References Cited

U.S. PATENT DOCUMENTS 3,937,956  2/1976  Lyon ............................. 204/157.1 R

FOREIGN PATENT DOCUMENTS 1284620  8/1972  United Kingdom ............ 204/DIG. 11

OTHER PUBLICATIONS

Farrar et al., Photochemical Isotope Separation as Applied to Uranium, Mar. 15, 1972, pp. 28–31.

Kuhn et al., Zeitschrift fur Phys. Chemie, vol. 21 (1933), (Partial translation, p. 136).
Letokhov, Science, vol. 180, No. 4085 (May 4, 1973), pp. 451–455.
Ambartzumian et al., JETP Letters, vol. 21 (Mar. 20, 1975), pp. 375–378.

Primary Examiner—Howard S. Williams
Attorney, Agent, or Firm—Herbert L. Lerner

[57] ABSTRACT

Separation of isotopes from a mixture of respective compounds particularly $UF_6$ compounds, containing the respective isotopes, physically or chemically by means of laser radiation, by passing through a vaporous mixture of the compounds, laser radiation having a spectral width maximally corresponding to the width of the isotope shift, the frequency being adjusted so that points of accumulation of rotational vibration lines of the one compound containing the desired isotope are covered in the spectrum, and the intensity of the radiation is so high that its absorption reaches the saturation region. With a pulsed laser, the duration of the radiation is shorter than the rotational relaxation time. With a continuously radiating laser, the intensity of the radiation is so high that the chemical or physical separation process is faster than the rotational relaxation.

10 Claims, 2 Drawing Figures

METHOD OF SEPARATING ISOTOPES

BACKGROUND OF THE INVENTION

1. Field of the Invention

The invention of the instant application relates to a method of separating isotopes physically or chemically from a mixture of respective gaseous compounds by means of laser radiation.

2. Description of the Prior Art

Such isotope separation methods have been recommended, heretofore, for example, in German Published Non-Prosecuted Applications DT-OS 2 150 232, 2 120 401 and 2 312 194 and have been especially proposed for uranium isotopes U 238 and U 235, with the expectation of being able thereby to enrich nuclear fuels considerably more economically than by means of the heretofore employed gas diffusion method and jet separation method. The basis of the foregoing proposals is that the differences of the absorption coefficients at a given wavelength of the different isotopes that are to be separated are as great as possible so that only the one isotope is excited or raised to a higher energy state and can be separated, for that reason, by conventional physical or chemical methods. It is difficult, however, to find spectral lines in the spectra of gaseous uranium compounds that are suited to the attainment of an adequately strong separation effect.

SUMMARY OF THE INVENTION

It is accordingly an object of the invention to provide a method of separating isotopes, wherein, also in cases of a so-called quasi-continuous spectrum in which the various bands are split and superimposed, an effective separation is afforded.

With the foregoing and other objects in view, there is provided in accordance with the invention, in a method of separating isotopes from a mixture of respective compounds containing the respective isotopes, physically or chemically by means of laser radiation, the improvement which comprises subjecting a vaporous mixture of the compounds containing the respective isotopes to laser radiation with a spectral width which corresponds maximally to the width of the isotope shift, adjusting the frequency of the laser radiation to cover points of accumulation of rotational vibration lines in the spectrum of the one compound containing the desired isotope, applying the radiation with sufficient intensity so that the absorption of the radiation reaches the saturation region, and excites the one compound containing the desired isotope, the radiation being from a pulsed laser and being applied in pulses having a duration shorter than the rotational relaxation time of the one compound containing the desired isotope. In the case of a continuously radiating laser, the intensity of the radiation is so high that the chemical or physical separation process is faster than the rotational relaxation.

The laser radiation applied has a spectral width which corresponds maximally or closely to the width of the isotope shift. The isotope shift is a displacement of spectral lines which come from the different isotopes of an element. The laser radiation passes through a vaporous mixture of the compound with the frequency of the laser radiation being adjusted so that points of accumulation or maximum density of rotational vibration lines of the one compound containing the desired isotope are covered in the spectrum. The intensity of the radiation is so high that its absorption reaches the saturation region, with the duration of the radiation from the pulsed laser being shorter that the rotational relaxation time. The process can also be performed using a continuously radiating laser instead of a pulsed laser, but then the chemical or physical separation process must be adjusted so that it is faster than the rotational relaxation time.

Other features which are considered as characteristic of the invention are set forth in the appended claims.

Although the invention is illustrated and described herein as embodied in a method for the separation of isotopes, it is nevertheless not intended to be limited to the details shown since various modifications may be made therein without departing from the spirit of the invention and within the scope and range of equivalents of the claims.

The invention, however, together with additional objects and advantages thereof will be best understood from the following description when read in connection with the accompanying drawings.

DESCRIPTION OF THE PREFERRED EMBODIMENT

Figure 1:
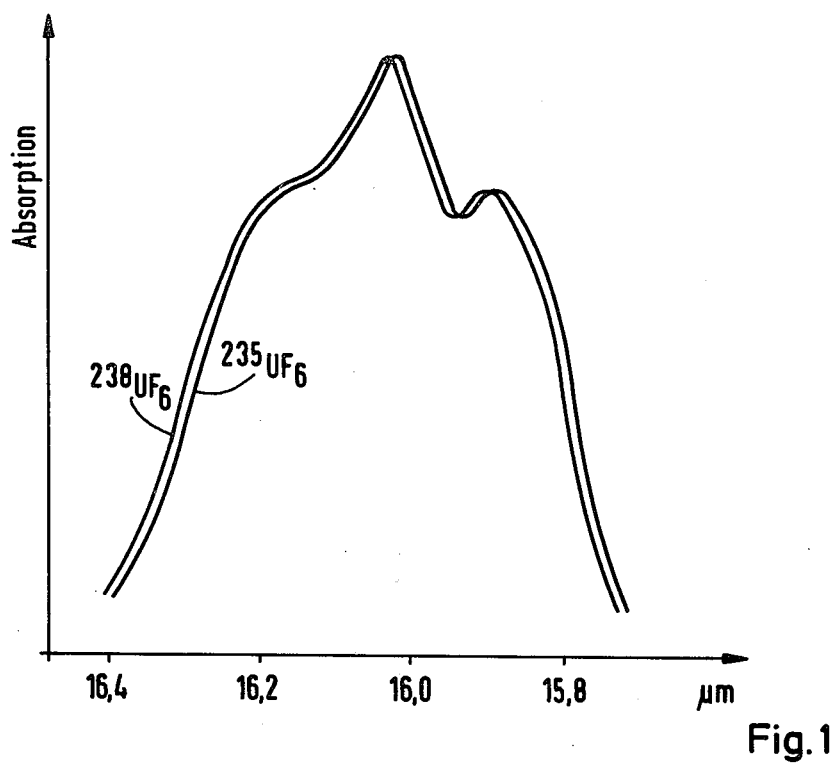
FIG. 1 is a plot diagram of radiation absorption by the isotope compounds $^{235}UF_6$ and $^{238}UF_6$ over a particular bandwidth showing a small frequency difference.

This method will now be illustrated further by the example of the separation of the uranium isotope compounds of $UF_6$. However, it is expressly noted that other isotope compounds can also be separated or enriched on the basis of this principle. The present method is based on the following considerations.

As mentioned, the spectrum of the isotope compound is quasicontinuous having peak-response lines at different frequencies or wavelengths. The differences in the absorption spectrum are therefore not sufficient to achieve a selective coverage of a single isotope compound according to the present state of the art. In such spectra, however, points of accumulation of rotational vibration lines occur in the infrared, in the visible or in the ultraviolet range. At such points (in the Q- and R-branches described in detail in Atomic Physics by Finkelnburg pp. 387–400), the number of lines within a narrow range of frequency bands can become very large, for example, 100 or larger, as referred to the $UF_6$ isotopy effect of the $\gamma_3$ band, which is at about 0.55 × cm$^{-1}$. If one now irradiates at such accumulation points, which are bounded by the frequencies $\gamma_1$ and $\gamma_2$, with laser light of high intensity, then only those molecules which are in certain rotational states will absorb light. These states are characterized in that their transitions or absorption frequencies are in the selected region. They are thereby strongly excited into a higher energy level. This is true particularly if, in the case of pulsed laser light, the pulse duration is shorter than the rotational relaxation time, which is the time required for the molecules to return to their ground energy state.

During this time, the chemical or physical separation process also takes place, since the excited molecules are in a proper receptive condition. These excited molecules represent only a fraction, Q, of all the molecules that can absorb light of the frequency range $\gamma_1$ to $\gamma_2$. If the radiated light intensity is sufficiently high so that saturation takes place, then one-half of the absorbing molecules are in the excited state, as a result of the fact that the probability of a transition from the ground state to the excited state is as high as in the reverse direction.

If we now call the molecules of the compound containing the first isotope 1, $^1A$, and those of the compound containing the second isotope 2, $^2A$, and designate the excited state with an asterisk, the concentration of the excited molecules $^1A^*$ is obtained as $$^1A^* = (^1A \cdot {^1Q})/2$$

and that of the excited molecule $^2A^*$ as $$^2A^* = (^2A \cdot {^2Q})/2$$

$^1Q$ and $^2Q$ represent the above-mentioned fractions for the compounds containing the isotopes 1 and 2. The difference between $^1Q$ and $^2Q$ is therefore responsible for the magnitude of the different excitation of the compounds containing the different isotopes. This difference is therefore the controlling factor for the separation factor $F = {^2Q}/{^1Q}$, in determining whether all the excited molecules $^2A^*$ can be separated by chemical or physical methods.

This separation factor can be attained if, as noted, an accumulation point in the quasi-continuous spectrum is found where the molecules $^1A$ and $^2A$ have different numbers and or different densities of distribution of rotational lines in the frequency ranges between $\gamma_1$ and $\gamma_2$. Since the selectivity is achieved as a consequence of the saturation, this method of excitation can be described by the term "selective saturation".

The absorption profile, or measurement of absorption of radiation by a cross-sectional area of the compounds containing the isotopes, such as $UF_6$, therefore no longer determines the separation effect. With this method, the absorption profile only determines the power density with which the irradiation must be performed in order to achieve saturation and, thereby, the desired separation effect. This saturation intensity $I_s$ is obtained from the absorption profile $\sigma$ of the substance to be separated, such as 235 $UF_6$, and the life $\tau$ of the excited state, as:

$$I_s = hc/(2 \lambda \tau \sigma),$$

where h = Planck's constant, c = velocity of light, $\lambda$ = wavelength of the laser light beam.

Instead of using pulsed light, one can also work with a steady beam of light, provided the separation process (chemical or physical) is faster than the rotational relaxation and the light intensity fulfills the saturation condition according to the above equation.

As an example, the method may be used with $UF_6$. If the strong band at 220 Å is irradiated, a power density $I_s$ of 20 MW per $cm^2$ is obtained. In this case, the absorption profile is $2.5 \times 10^{-17} cm^2$ and the life of the excited state $\tau = 10^{-9}$ sec.

As shown in FIG. 1, the bands of the compounds $^{235}UF_6$ are at a wave number of 623 $cm^{-1}$ (corresponding to a wavelength of 16 μm). Because of the small isotopy shift, no wavelength is found which can be used with the previously known laser isotope separation method. However, the situation is different with the method of selective saturation of the present invention, where the line density is an important factor.

Figure 2:
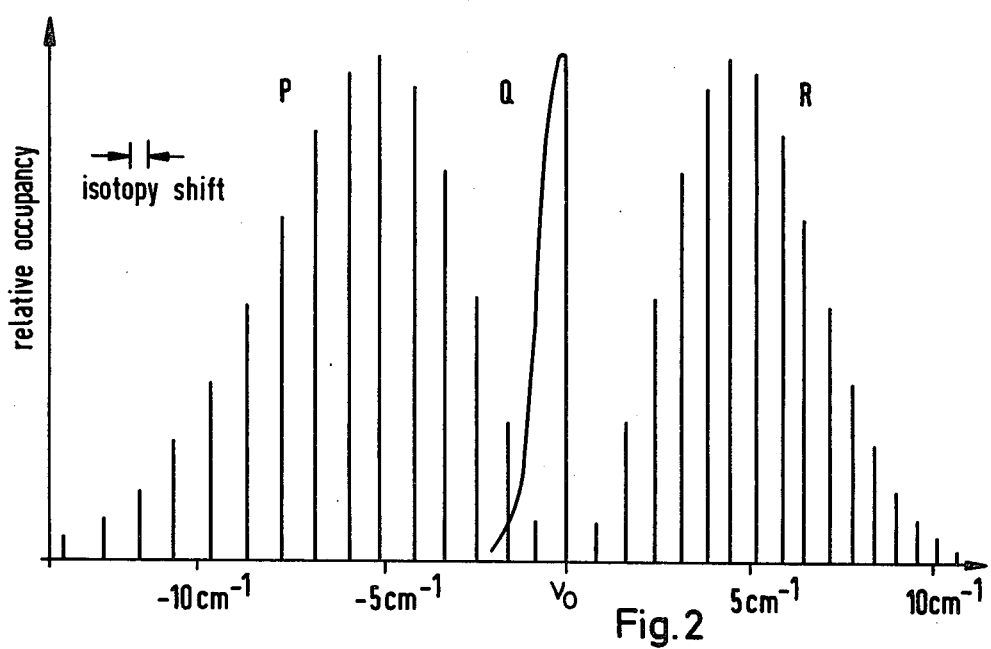
FIG. 2 is a plot diagram of the rotational vibration spectrum of an isotope compound indicating line densities or occupancy at difference portions of the frequency band.

The rotational vibration spectrum shown in FIG. 2 indicates that there is a considerably higher line density in the Q-branch than in the P- and R-branches. There are 150 lines represented within the curve shown for the Q-branch, which stem from nearly 100% of all possible molecular ground states, while only every 10th rotational line is indicated for the P- and the R-branches. This rotational splitting blurs this spectrum still further, but the Q-branch represents an accumulation point suited for the use of the present method. With irradiation with a frequency $\gamma_o + 0.25 cm^{-1}$ and a laser width of $\Delta \gamma \approx 0.5 cm^{-1}$, a separation factor F = 2400 is calculated.

This means that the present separation or excitation method is suited predominantly for such bands in the infrared, visible range or ultraviolet which have no band edge in the R-branch but have a Q-branch which absorbs radiation, even if the absorption is weak.

Assuming that the $^{235}UF_6$ compound consists of several vibration band systems which are sligthly shifted with respect to each other, the following situation results:

If irradiation into the $^{235}UF_6$ Q-branch is used which is located at the shortest wavelength, then the R-branch of the $^{238}UF_6$ band already absorbs relatively strongly. In the worst case, the maximum of the $^{238}UF_6$ R-branch lies at the point where the Q-branch of the $^{235}UF_6$ absorbs. In this case, a separation factor F of about 6 is obtained.

This means that if the Q-branch of the $^{235}UF_6$ absorbs at a location where the R-branch of an $^{238}UF_6$ band is situated, using the present method of selective saturation, separation factors are obtained which lie between 6 and 2400, depending on the overlap of the bands.

Thus this method is suitable for isotope separation even if the spectral differences of the two uranium compounds $^{235}UF_6$ and $^{238}UF_6$ are small. In the case of a physical cancellation of the spectrum, such as is possible, for example, as a result of line splitting, super position of "hot bands", or a close sequence of band progressions, large separation factors result if the accumulation points are utilized. The necessary high power densities can readily be produced with pulsed operation. During these short pulse times, rotational relaxation is not possible. This, however, is not a disadvantage but is a prerequisite necessary for the proper functioning of the chemical or physical separation process.

The method is also facilitated by the fact that the laser used need not be extremely narrow-band. As a limit, its spectral width may correspond to the isotope shift $\Delta \gamma$ iso. Such wide-band lasers, particularly dye lasers, can be operated with a higher output power and higher efficiency than narrow-band lasers.

It is important in the method of the present invention to determine the laser wavelength suitable for the separation or enrichment. This wavelength must be determined for every compound and this determination may readily be accomplished with conventional spectrometers, which operate with light of low intensity, if the type of the sub-bands (P-, Q-, R-structure, etc.) is clearly identified from the band contour. Such a spectrum permits a rough determination of the separation factor attainable with this method. For a strongly quasi-continuous spectrum, examination by fluorescence-spectrometry represents a suitable method for finding the accumulation points. In this case, the substance $^1A$ is irradiated with laser light, having a pulse duration which is shorter than the rotational relaxation time and an intensity which is at least as large as the saturation intensity $I_s$. A measurement is made of the fluorescence light which is proportional to the number of the molecules $^1A^*$ excited thereby. The same measurement is repeated for the substance $^2A$. The separation factor is then equal to the ratio of the two measured values. The separation factor can be optimized experimentally through variation of the wavelength and the bandwidth of the laser beam.

Supplementing the above discussion, it should be mentioned that the photochemical reaction of the excited $UF_6$ isotope with $H_2$, CO, $CO_2$, $O_2$, Xe and other compounds which do not react with $UF_6$ at room temperature, or do so only slowly is particularly well suited as the separation process.

However, other known processes may also be utilized, such as, for example,
(a) predissociation
(b) photoionization
(c) two-photon photoreaction
(d) two-photon predissociation
(e) two-photon dissociation, and
(f) two photon ionization.

The method described can, of course, also be used for the separation of other isotopes. Thus, for example, the carbon isotopes $^{13}C$ and $^{12}C$ can be separated and enriched vis selective saturation excitation by irradiation into the $CH_4$ deformation band, which has a very slightly curved Q-branch.

There are claimed:

1. In a method of separating isotopes from a mixture of respective compounds containing the respective isotopes and having a quasi-continuous spectrum, physically or chemically by means of laser radiation, the improvement which comprises subjecting a vaporous mixture of the compounds containing the respective isotopes to laser radiation with a spectral width which corresponds maximally to the width of the isotope shift, determining points of accumulation of rotational vibration lines in the spectrum of the one compound containing the desired isotope, adjusting the frequency of the laser radiation to cover points of accumulation of rotational vibration lines in the spectrum of the one compound containing the desired isotope, applying the radiation with sufficient intensity so that the absorption of the radiation reaches the saturation region, and excites considerably more molecules of the one compound containing the desired isotope compared to molecules containing the other isotope, the radiation being from a pulsed laser and being applied in pulses having a duration shorter than the rotational relaxation time of the one compound containing the desired isotope.

2. Method according to claim 1 wherein said points of accumulation of rotational vibration lines in the spectrum are determined by means of fluorescence spectroscopy.

3. Method according to claim 1 wherein said mixture of compounds is uranium isotope compounds, and wherein laser radiation is applied in one of the visible, ultraviolet and infrared regions.

4. Method according to claim 3 wherein said uranium isotope compounds are $UF_6$ isotope compounds.

5. Method according to claim 4 wherein said laser radiation with a wavelength of 16 $\mu$m covers the Q-branch of the $\gamma_3$ band of the $^{235}UF_6$.

6. In a method of separating isotopes from a mixture of respective compounds containing the respective isotopes and having a quasi-continuous spectrum, physically or chemically by means of laser radiation, the improvement which comprises subjecting a vaporous mixture of the compounds containing the respective isotopes to laser radiation with a spectral width which corresponds maximally to the width of the isotope shift, determining points of accumulation of rotational vibration lines in the spectrum of the one compound containing the desired isotope, adjusting the frequency of the laser radiation to cover points of accumulation of rotational vibration lines in the spectrum of the one compound containing the desired isotope, the radiation being from a continuously radiating laser and being applied so as to excite considerably more molecules of the one compound containing the desired isotope compared to molecules containing the other isotope, with an intensity of the radiation sufficiently high that said chemical or physical separation process is faster than the rotational relaxation of the one compound containing the desired isotope.

7. Method according to claim 6 wherein said points of accumulation of rotational vibration lines in the spectrum are determined by means of fluorescence spectroscopy.

8. Method according to claim 6 wherein said mixture of compounds is uranium isotope compounds, and wherein laser radiation is applied in one of the visible, ultraviolet and infrared regions.

9. Method according to claim 8 wherein said uranium isotope compounds are $UF_6$ isotope compounds.

10. Method according to claim 9 wherein said laser radiation with a wavelength of 16 $\mu$m covers the Q-branch of the $\gamma_3$ band of the $^{235}UF_6$.

* * * * *